Feb. 26, 1935.  A. N. JOHNSON  1,992,619
FISHING TROLLEY SINKER
Filed May 3, 1934
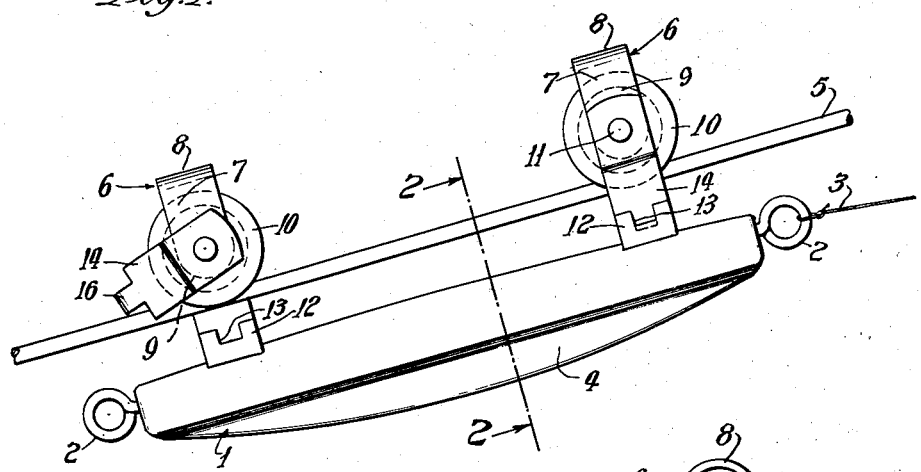
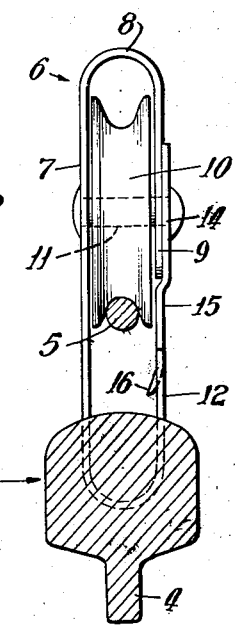
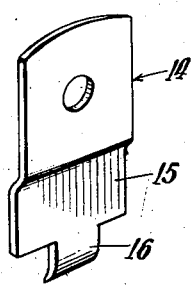
Inventor:
Adolph N. Johnson,
By: Arthur Wm Nelson
Atty.

Patented Feb. 26, 1935

1,992,619

UNITED STATES PATENT OFFICE 1,992,619

FISHING TROLLEY SINKER

Adolph N. Johnson, Chicago, Ill.

Application May 3, 1934, Serial No. 723,629

3 Claims. (Cl. 43—27)

This invention relates to improvements in fishing trolley sinkers and it consists of the matters hereinafter described and more particularly pointed out in the appended claims.

The device with which my invention is more particularly concerned is of the kind adapted to be engaged on an anchored trolley line to carry a fishing line usually provided with a plurality of hooks, out to the desired location in the water being fished. Such a device generally includes a weighted body with an eye to which the fishing line is attached and such a device also includes a plurality of trolley wheels for running on the trolley line. Generally, the device is applied laterally to engage the wheels on the trolley line and the trolley wheel yokes are each made to open at one side to permit such lateral engagement. In such devices as heretofore made, the arm which closes the open side of the yoke, after a short period of use would become loose and would open under wave action, to the great annoyance of the user.

One of the objects of the present invention is to provide a device of this kind which includes a simple but improved means for holding the yoke in its closed position so that the device cannot accidentally come off the trolley line and which means may be readily manipulated to open the yoke for removal of the device from the trolley line when so desired.

Another object of the invention is to provide a device of this kind wherein the yoke includes a stationary arm and a pivoted arm to coact therewith in closing the open side of the yoke, the said arms having an interengaging tongue and recess arrangement which prevents such accidental movement of the pivoted arm that will open the yoke with a probable entanglement of the entire fishing apparatus and a possible loss of the device therefrom.

A further object of the invention is to provide a device of this kind which is easy to manipulate in applying it to or removing it from a trolley line and which device is so simple in construction that it may be made and sold at an extremely low price.

The above mentioned objects of the invention, as well as the several advantages thereof, will more fully appear as I proceed with my specification.

In the drawing:

Fig. 1 is a view in side elevation of the improved device, and shows one of the yokes as closed at both sides and shows the other yoke as open at one side, in the position so that it may be applied laterally to or removed from the associated trolley line;

Fig. 2 is a transverse vertical sectional view through the device on an enlarged scale as taken on the line 2—2 of Fig. 1; and Fig. 3 is a perspective view on an enlarged scale of a certain pivoted arm embodied in the device for opening or closing one side of the associated trolley wheel supporting yoke.

Referring now in detail to that embodiment of the invention illustrated in the accompanying drawing:

1 indicates the sinker of the device in the form of an elongated body of metal to give it the desired weight. Ordinarily such a body is made of cast or moulded lead. At each end the body is provided with an eye 2, either one of which may be used in tying a fishing line 3 thereto. The body which tapers towards both ends includes a relatively thin keel-like rib 4 on its bottom which prevents undue lateral swaying of the body when traveling on the associated trolley line 5.

Rising from the top side of the body near each end is a yoke 6. Each yoke includes an arm 7 at one side which is bent into an inverted U-shaped top loop 8 that includes a downwardly extending arm 9. In said loop is located a grooved trolley wheel 10 that is journalled on a pin 11 extending between said arms. Each yoke also includes a relatively short upstanding arm 12 suitably fixed to the body and provided at its top end with an upwardly opening recess 13, the side edges of which form opposed shoulders as is apparent. The arm 12 is preferably disposed in the plane of the arm 9.

14 indicates a yoke closing member or arm that is pivoted at its top end on the pin 11 outside the arm 9. The bottom portion 15 is offset inwardly to bring it into the plane of the arm 12 which is disposed in the plane of the arm 9. The bottom end of the member 14 is made to provide a tongue 16 that is curved slightly inwardly at its bottom end. Said tongue is of a width corresponding to that of the recess 13 and is of a length to extend below the bottom of the recess 13 when the member is in yoke closing position. By means of the offset portion 15, a slight outward flexing action is induced in the arm about the bottom edge of the arm 9 as a fulcrum so that said member tends to spring slightly outwardly.

In applying the device to a trolley line 5, both members 14 are swung about the associated pivot pin 11 into the position shown at the left hand end of Fig. 1, so that each yoke is open at one side. The device is then moved laterally toward the trolley line which will pass through the space between the top end of the arms 12 and the bottom of the trolley wheels 10. With the wheels thus engaged upon the trolley line, the members 14 are swung down into the plane of the arms 12. In this movement of said members the bottom portions 15 thereof are sprung slightly inwardly by thumb pressure so that the tongue 16 thereof, may pass the edge of the arm 12 as it approaches the same. When the tongue reaches the recess 13 in said arm, it will snap or spring into the same so that the edges of the tongue will engage the shoulder-like side edges of the recess. As the tongue is somewhat longer than the recess is deep and as the bottom end of the tongue is bent inwardly as previously described, said tongue cannot pass through the recess but will be stopped in a manner insuring the proper engagement in the recess. This closes the open side of the yoke.

By reason of the tongue and recess arrangement, the member 14 is held against accidental dislodgment into a position wherein it would be free to swing about the pin 11 to open the associated side of the yoke.

When it is desired to remove the device from the trolley line, thumb pressure inward on the bottom end 15 of each member 14 will dislodge the tongue from the recess so that the member may be swung into the position shown at the left hand end of Fig. 1 to open the associated side of the yoke. When both yokes are open the device may be withdrawn laterally from off the trolley. By the provision of an eye at each end of the weight body or sinker, either eye may be employed to attach the fishing line thereto. By reason of the keel-like rib 4, the device is more stable in its movement on the trolley line and against swaying under heavy wave action. Thus the possibilities of entanglement of the fishing apparatus in use is reduced to a minimum.

While in describing the invention, I have referred in detail to the form, arrangement and construction of the parts thereof, the same is to be considered only in the illustrative sense, so that I do not wish to be limited thereto except as may be specifically set forth in the appended claims.

I claim as my invention:

1. A device of the kind described embodying therein a weight member, a plurality of yokes connected thereto, a trolley wheel journalled in each yoke, each yoke including at one side thereof, a pivoted yoke closing arm and a stationary arm, one of said arms having a recess between its edges providing oppositely facing shoulders and the other arm having a tongue for disposition in said recess with its side edges engaged with said shoulders, to yieldingly hold the pivoted arm in yoke closing position, said tongue having a length greater than the depth of said recess to prevent said tongue from passing outwardly through said recess.

2. A device of the kind described embodying therein a weight member, a plurality of yokes connected thereto, a trolley wheel journalled in each yoke, each yoke including at one side thereof an arm fixed to and extending upwardly from the weight member and formed with a top opening recess and a second arm that is pivoted at its top end coincident with the axis of the associated trolley wheel, said pivoted arm having a tongue, a part of which is adapted for engagement in said recess and another part of which extends below the bottom of the recess to prevent the tongue from passing outwardly through said recess.

3. A device of the kind described embodying therein a weight member, a plurality of yokes connected thereto, each yoke including laterally spaced, long and short arms that extend upwardly from the weight member, the long arm being bent over at its top end to form a loop, the shorter arm having an upwardly opening recess in its top end, a pulley wheel in said loop, a pin pivotally supporting the wheel in said loop, a member pivoted at its top end on said pin and adapted to cooperate with the short arm to close the associated side of the yoke, said member having a tongue at its bottom end for engagement in said recess of said short arm and being of a length greater than the depth of the recess to extend below the bottom of the same and prevent the tongue from passing outwardly through the recess.

ADOLPH N. JOHNSON.